United States Patent [19]

Reese et al.

[11] 4,197,629

[45] Apr. 15, 1980

[54] APPARATUS FOR MACHINING AND STATICALLY BALANCING A LARGE AND HEAVY WORKPIECE

[75] Inventors: Jack L. Reese, Spring Grove; Robert G. Grubb; Selim A. Chacour, both of York, all of Pa.

[73] Assignee: Allis-Chalmers Corporation, Milwaukee, Wis.

[21] Appl. No.: 843,796

[22] Filed: Oct. 20, 1977

[51] Int. Cl.² .......................... B23B 3/10; B23P 23/00; G01M 1/168
[52] U.S. Cl. ...................................... 29/560; 82/2 D; 82/DIG. 8; 73/483; 408/2
[58] Field of Search ............ 82/2 D, DIG. 8; 73/483, 73/484, 485, 486, 487; 29/27 A, 27 R, 560; 408/2

[56] References Cited

U.S. PATENT DOCUMENTS

| | | | |
|---|---|---|---|
| 683,592 | 10/1901 | Bullard | 82/2 D |
| 890,710 | 6/1908 | Riddell | 73/483 |
| 1,670,772 | 5/1928 | Jones | 82/2 D |
| 2,060,958 | 11/1936 | Taylor | 408/2 |
| 2,359,470 | 10/1944 | Eddison | 408/2 |
| 2,940,315 | 6/1960 | Rued | 73/483 |
| 2,979,958 | 4/1961 | Kennedy | 73/483 |
| 3,090,173 | 5/1963 | Strickland et al. | 82/2 D |
| 3,736,840 | 6/1973 | Durand | 82/2 D |

*Primary Examiner*—Leonidas Vlachos
*Attorney, Agent, or Firm*—Robert C. Sullivan

[57] ABSTRACT

An apparatus for use in machining and statically balancing a large and heavy workpiece such as the runner of a hydraulic turbine. The apparatus includes a vertical center support column on the upper end of which is mounted a rotatable turntable. The workpiece which is to be machined and statically balanced is suitably clamped to and rotates with the turntable, the workpiece extending radially beyond the turntable so that as the turntable is rotated the workpiece is moved past a machining tool which is suitably supported along the path of rotary movement of the workpiece. The turntable is detachably secured to a composite member which comprises a bearing, such as a roller bearing, integral with a gear, such as an internal ring gear, the composite member being in underlying relation to the turntable. A pair of diametrically opposed rotary hydraulic motors are housed within the center support column, each hydraulic motor rotatably driving a pinion gear which meshes with the internal ring gear of the composite member secured to the underside of the turntable, whereby to rotatably drive the turntable. A hydraulic cylinder is carried by the center column, and a piston movable within the hydraulic cylinder is rigidly connected to the turntable. The hydraulic cylinder may be continuously pressurized while the turntable is rotating during the machining operation whereby to exert an upward force on the turntable sufficiently to relieve a predetermined amount of thrust load on the bearing and thus whereby to make a greater part of the rotative power applied to the turntable available for the machining operation. Upon the completion of the machining operation, when it is desired to statically balance the workpiece, the composite member comprising the bearing integral with the gear is detached from the turntable, although the composite member remains in underlying relation to the turntable. For the static balancing operation, the turntable with the workpiece, such as the runner of the hydraulic turbine, still secured thereto, is then elevated by means of the attached hydraulic piston sufficiently to clear the centering joint with which it normally engages the composite bearing and gear. Any improper weight distribution of the workpiece will cause a tilting of the piston in the hydraulic cylinder together with a tilting of the attached turntable and of the workpiece mounted on the turntable, such tilting being sensed by machinist's levels or the like temporarily positioned on the workpiece. An appropriate compensating weight or weights is/are then permanently added to a circumferentially-extending weight pocket on the workpiece whereby to correct the detected improper weight distribution of the workpiece.

11 Claims, 10 Drawing Figures

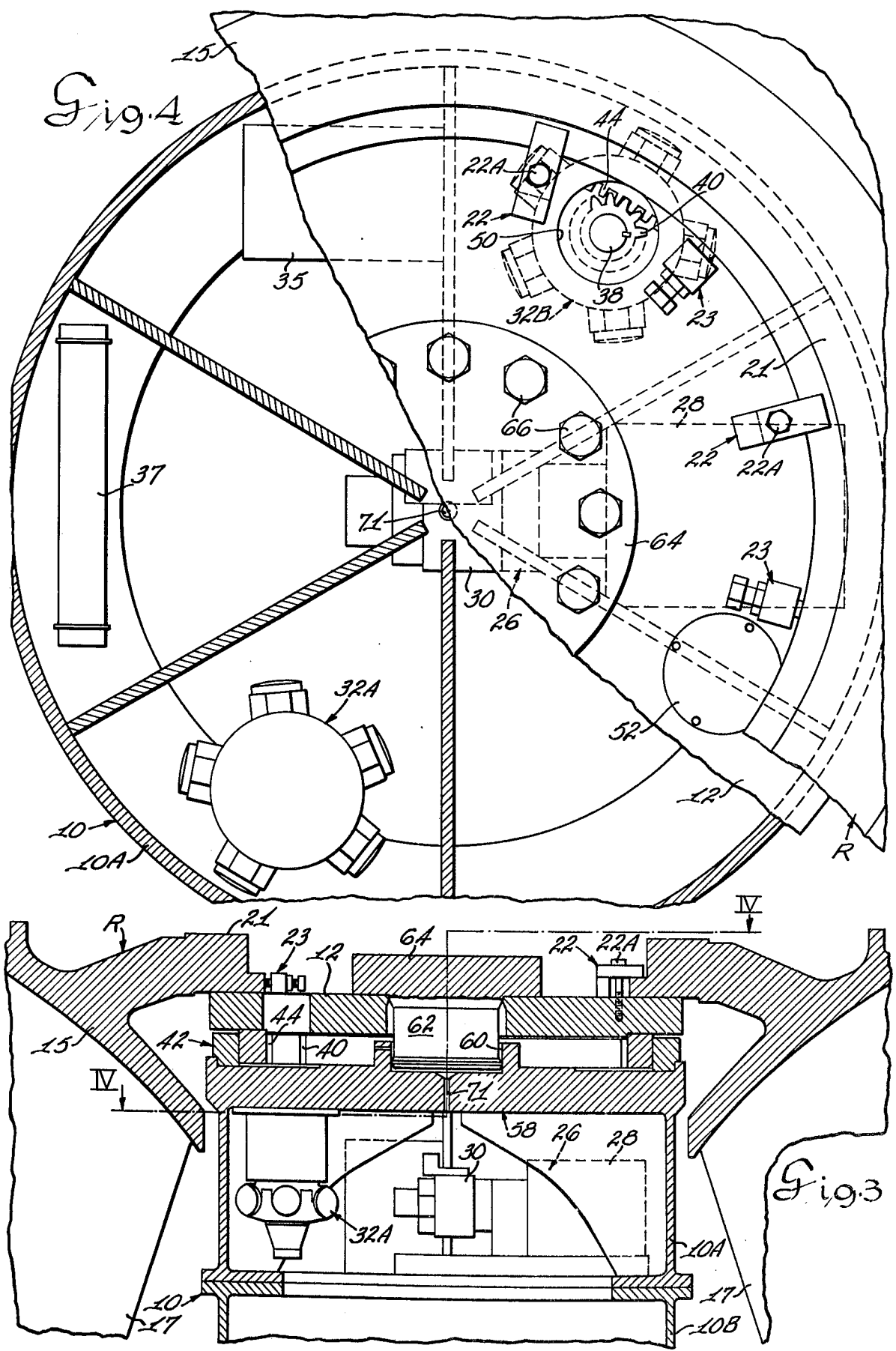

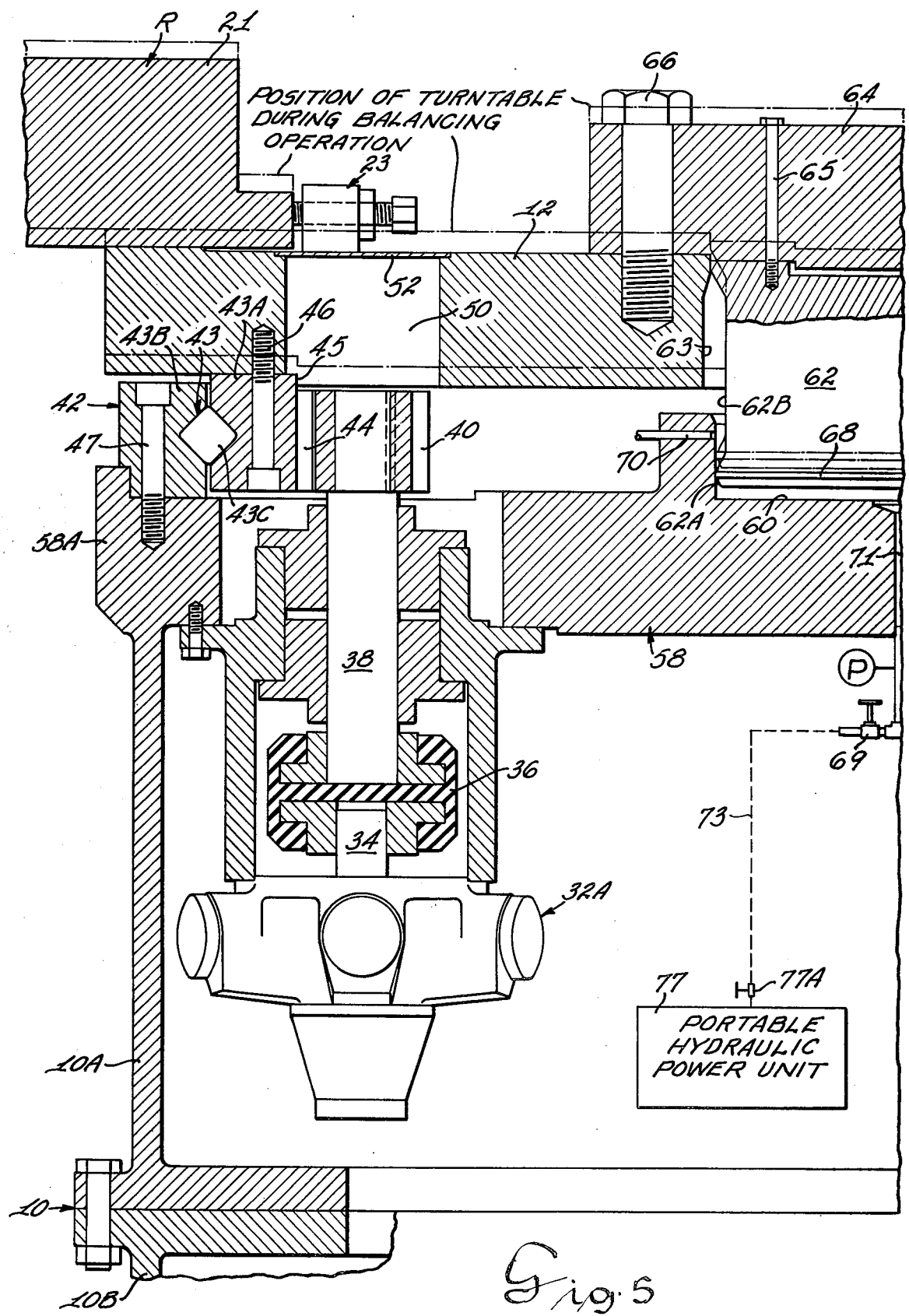

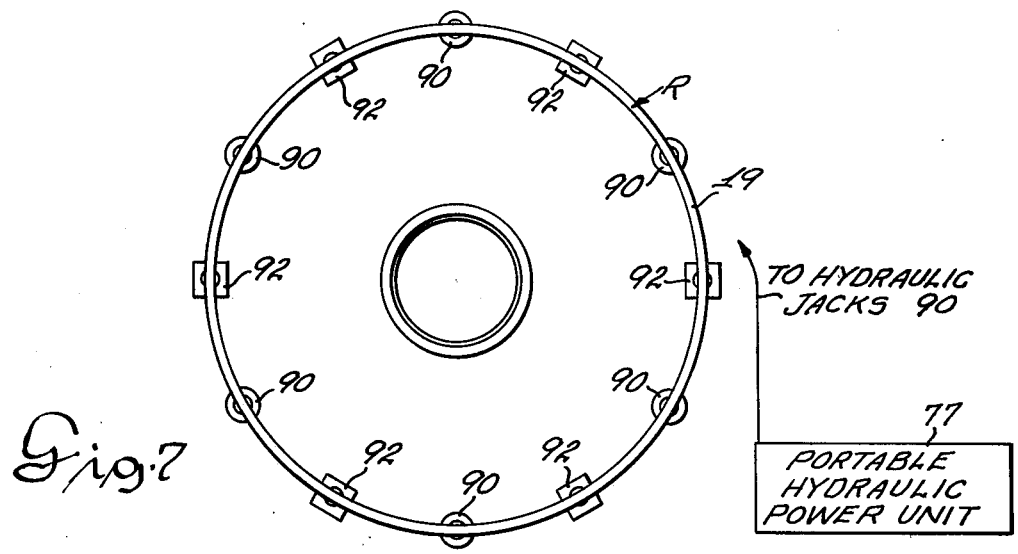
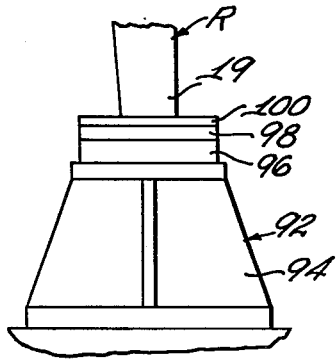
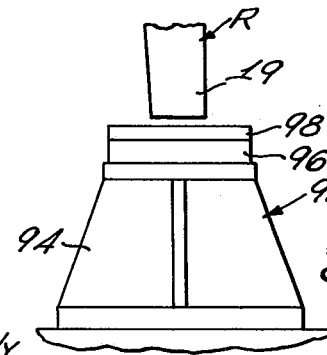
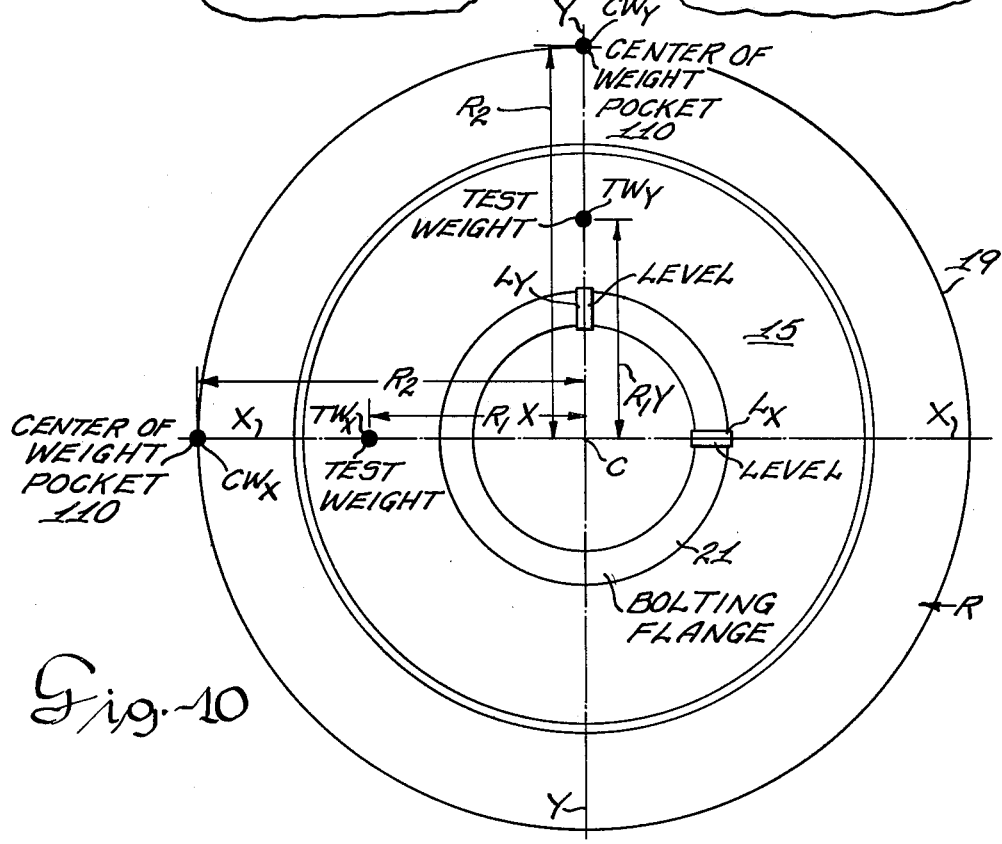

APPARATUS FOR MACHINING AND STATICALLY BALANCING A LARGE AND HEAVY WORKPIECE

BACKGROUND OF THE INVENTION

1. Field of the Invention

This invention relates to an apparatus for machining and statically balancing a large and heavy workpiece, and more particularly to an apparatus of the aforesaid type which includes a high capacity turntable on which the workpiece is mounted for rotation past a stationarily-mounted machining tool, and in which the apparatus also includes a self-contained drive package for the turntable and a balancing cylinder, whereby the workpiece may not only be machined while mounted on the turntable but may also be statically balanced subsequent to the machining operation without being removed from the turntable. The invention will be described in connection with the machining and balancing of the extremely heavy and large runner of a hydraulic turbine. Such a runner typically might have a weight of 450 tons, and a physical size such as 9.9 meters in diameter and a height of 5.6 meters. However, the apparatus of the invention is not necessarily restricted to use in the machining and static balancing of hydraulic turbine runners, but may be used for the machining and static balancing of other types of workpieces. The apparatus of the invention may be used in connection with the machining and static balancing of new units, and also in connection with the repair of old units which require machining and/or static balancing.

The apparatus for machining and statically balancing a workpiece as will be hereinafter described is particularly useful for use in machining and statically balancing an extremely large workpiece such as the runner of a hydraulic turbine, for example, which is too large and heavy for construction, machining and balancing all in one piece at a manufacturing site which may be far distant from the site of its intended use, and which therefore requires that a plurality of pieces manufactured at the factory be fabricated into a unitary member at or near the site of its intended use, with the fabricated unitary member also being finish machined and statically balanced at or near the site of its intended use.

OBJECTS OF THE INVENTION

Accordingly, it is an object of the present invention to provide an apparatus for machining and statically balancing a large and heavy workpiece all on the same apparatus in accordance with which the workpiece to be machined and statically balanced is mounted on a rotatable turntable and moved past a machining tool mounted along the path of rotary movement of the workpiece, and in which the turntable is rotatably driven by a drive mechanism contained in or supported by the same column which supports the turntable for rotation.

It is another object of the invention to provide an apparatus for machining and statically balancing a large and heavy workpiece, such as the runner of a hydraulic turbine, for example, in which the workpiece is supported on a rotatable turntable while being machined, and in which the workpiece may be statically balanced subsequent to the machining operation while still mounted on the rotatable turntable and without removing the workpiece from the turntable.

It is a further object of the invention to provide a rotatable turntable for supporting a large and heavy workpiece both during the machining of the workpiece and also during the static balancing operation on the workpiece subsequent to the machining operation, in which the rotatable turntable is supported by a column-like member which also houses or supports the self-contained drive package for the rotatable turntable.

It is a further object of the invention to provide a rotatable turntable for supporting a workpiece during a machining operation in which the turntable is mounted on a machining column, with the drive package for the turntable being mounted on or supported by the machining column, and providing sufficient stability and power to permit machining of the workpiece by "single point cutting" of the workpiece (i.e.—use of a cutting tool having a single cutting edge as distinguished from a rotary cutting tool such as a milling tool having multiple cutting edges) whereby to provide maximum efficiency of metal removal during the machining operation.

It is still a further object of the invention to provide a turntable arrangement for supporting a heavy workpiece during a machining operation in which the thrust load on the bearing supporting the turntable for rotation can be relieved during the machining operation while the turntable is rotating by use of a power operated linear actuator such as a hydraulic cylinder and a cooperating piston whereby to exert an upward force on the rotating turntable which relieves a predetermined amount of thrust load in the bearing, thereby making more power available for the machining operation.

It is still a further object of the invention to provide an apparatus for machining and statically balancing a large workpiece such as the runner of a hydraulic turbine in which the apparatus includes a rotatable turntable which can be disconnected from the rotary drive mechanism used during the machining operation for rotating the turntable, and in which the turntable and the workpiece mounted thereon can then be axially raised upwardly by a power operated linear actuator, such as a hydraulic cylinder and piston, to a position suitable for use in statically balancing the workpiece subsequent to the machining operation on the workpiece, and in which the piston which supports the turntable is capable of tilting movement in the hydraulic cylinder whereby the turntable and the workpiece mounted thereon are tiltably movable if there is an improper weight distribution in the workpiece such as the hydro-turbine runner.

In achievement of these objectives, there is provided in accordance with an embodiment of the invention an apparatus for use in machining and statically balancing a large and heavy workpiece such as the runner of a hydraulic turbine. The apparatus includes a vertical center support column on the upper end of which is mounted a rotatable turntable. The workpiece which is to be machined and statically balanced is suitably clamped to and rotates with the turntable, the workpiece extending radially beyond the turntable so that as the turntable is rotated the workpiece is moved past a machining tool which is suitably supported along the path of rotary movement of the workpiece. The turntable is detachably secured to a composite member which comprises a bearing, such as a roller bearing, integral with a gear, such as an internal ring gear, the composite member being in underlying relation to the turntable. At least one rotary hydraulic motor, but preferably a pair of diametrically opposed rotary hydraulic motors, is/are housed within the center support column, each hydraulic motor rotatably driving a pinion gear which meshes with the internal ring gear of the composite member secured to the underside of the turntable, whereby to rotatably drive the turntable. A hydraulic cylinder is carried by the center column, and a piston movable within the hydraulic cylinder is rigidly connected to the turntable. The hydraulic cylinder may be continuously pressurized while the turntable is rotating during the machining operation whereby to exert an upward force on the turntable sufficient to relieve a predetermined amount of the thrust load on the bearing and thus whereby to make a greater part of the rotative power applied to the turntable available for the machining operation. Upon the completion of the machining operation, when it is desired to statically balance the workpiece, the composite member comprising the bearing integral with the internal ring gear is detached from the turntable, although the composite member remains in underlying relation to the turntable. For the static balancing operation, the turntable with the workpiece such as the runner of the hydraulic turbine, still secured thereto, is then elevated by means of the attached hydraulic piston sufficiently to clear the centering joint with which it normally engages the composite bearing and gear. Any improper weight distribution of the workpiece will cause a tilting of the piston in the hydraulic cylinder together with a tilting of the turntable and of the workpiece mounted on the turntable, such tilting being sensed by machinist's levels or the like temporarily positioned on the workpiece. An appropriate compensating weight or weights is/are then permanently added to a circumferentially extending weight pocket on the workpiece whereby to correct the detected improper weight distribution of the workpiece.

Further objects and advantages of the invention will become apparent from the following description taken in conjunction with the accompanying drawings in which:

BRIEF DESCRIPTION OF THE DRAWINGS

FIG. 3 is a vertical sectional view of the center column, including the turntable mounted at the upper end of the center column and the drive package for the turntable, which drive package is mounted interiorly of the center column;

FIG. 4 is a view taken along line IV—IV of FIG. 3;

FIG. 5 is an enlarged view in vertical section showing details of the drive train for the rotatable turntable, and also showing details of the hydraulic cylinder and piston arrangement which cooperates with the turntable;

FIG. 7 is a diagrammatic view of the arrangement of the hydraulic jacks and of the stationary supports which are used either preliminary to or during the balancing operation on the runner;

FIG. 8 is a diagrammatic view in elevation of one stationary jackstand and the spacers on top of the jackstand as they appear at the time when the portable hydraulic power unit is about to be disconnected from the hydraulic jacks, and with the bottom of the runner resting on the upper surface of the uppermost spacer on the jackstand;

FIG. 9 is a view of the stationary jackstand and spacers of FIG. 8 but with the uppermost spacer of FIG. 8 removed from above the jackstand, and with the bottom of the runner shown floating in the balancing position; and FIG. 10 is a diagrammatic top plan view of the runner showing the positioning of the test weights and of the final compensating or balancing weights added to the circumferentially extending weight pocket of the runner in connection with the balancing operation.

DESCRIPTION OF THE PREFERRED EMBODIMENT

Figure 2:
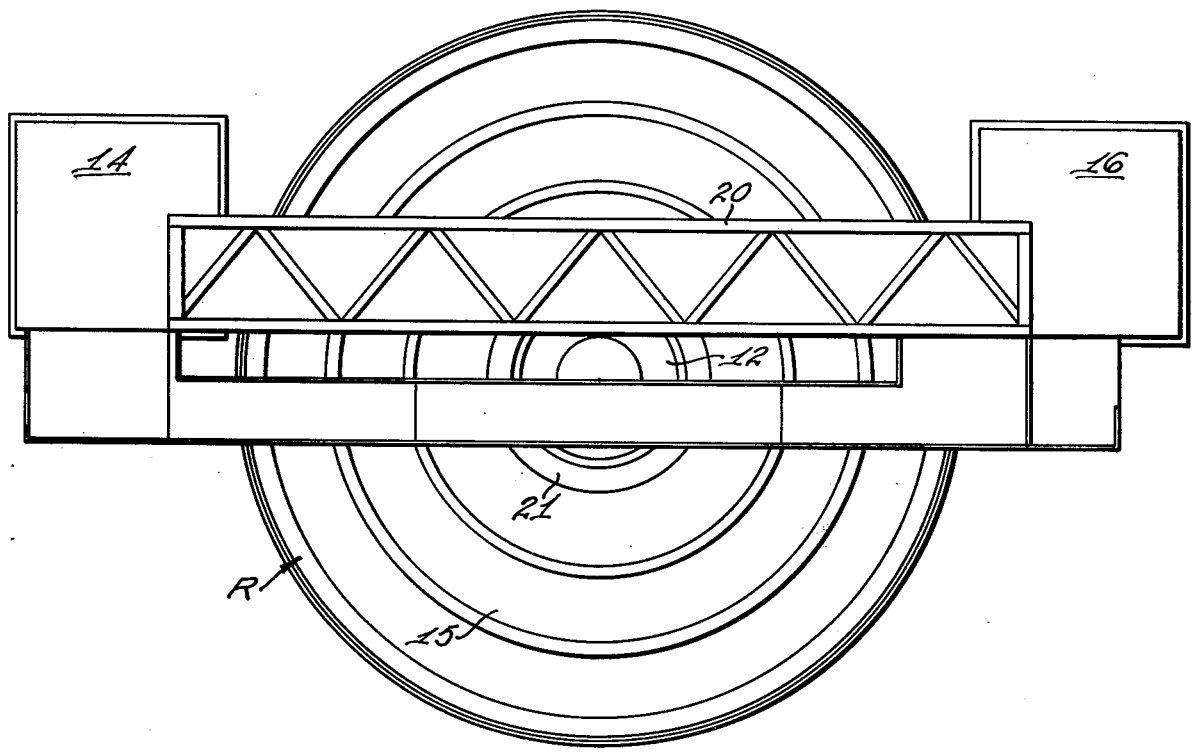
FIG. 2 is a top plan view of the apparatus of FIG. 1.
Figure 1:
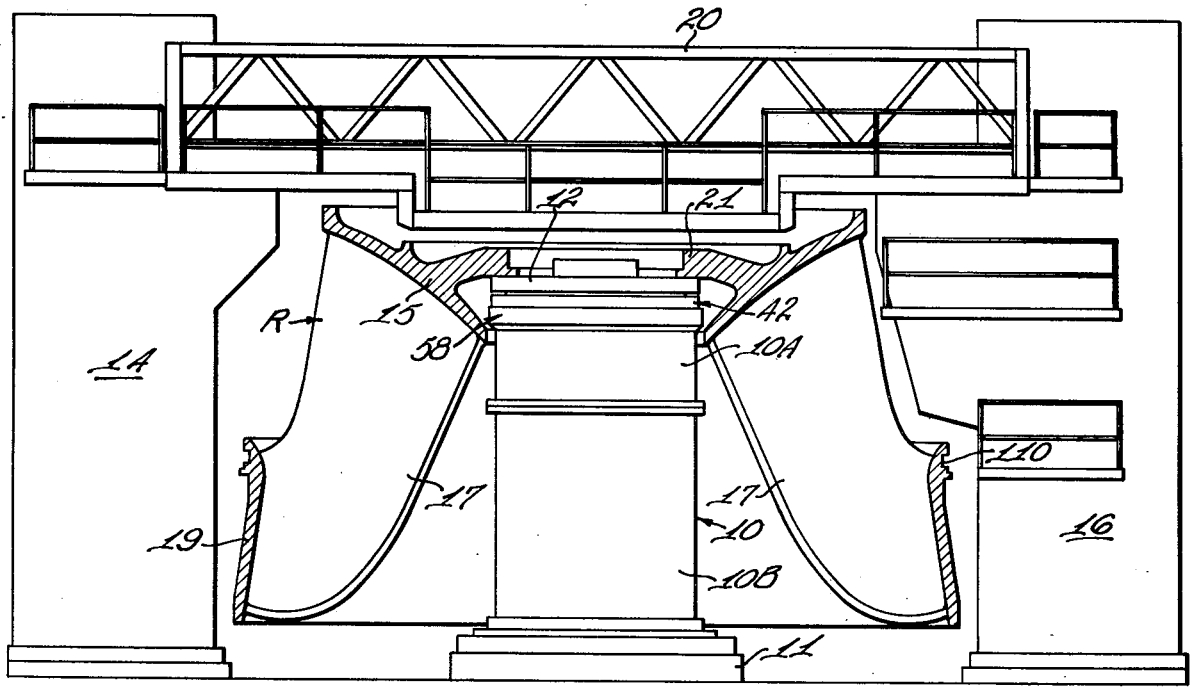
FIG. 1 is a vertical elevation view showing the general arrangement of the machining and static balancing apparatus, including the center column on which the rotatable turntable is mounted and in which center column the drive package for the rotatable turntable is housed, and further including a pair of stationary outer columns positioned on opposite sides of the center column, and a horizontal bridge connected between the two outer columns, at least one of said stationary outer columns and the horizontal bridge being adapted to support a portable machining tool in various alternative locations of the machining tool.

Referring now to the drawings and more particularly to FIGS. 1-3, inclusive, there is shown a stationary center column generally indicated at 10 which supports a rotating turntable or head 12 on which is mounted a workpiece R to be machined and to be subsequently statically balanced. Center column 10 comprises a cylindrical upper column portion 10A bolted to a cylindrical lower column portion 10B. The lower end of lower column portion 10B is mounted on a suitable foundation 11. In the illustrated embodiment, the workpiece being machined is the runner of a hydraulic turbine. Runner R typically may have a weight of 450 tons, a diameter of 9.9 meters, and a height of 5.6 meters. The runner R includes a crown 15, to which are secured buckets 17, and a band 19 is secured circumferentially about the lower portion of buckets 17.

As best seen in FIG. 1, at the upper portion of runner band 19 there is provided a channel-like groove 110 which extends circumferentially 360° around the entire circumference of runner band 19. Groove 110 defines a "weight pocket" into which compensating or balancing weights such as $CW_x$ and $CW_y$ (see FIG. 10) are placed at the conclusion of the balancing operation on runner R, as will be described hereinafter, to compensate for any unbalanced condition of runner R. The inner periphery of runner crown 15 defines a bolting flange 21 which is ultimately secured to the shaft of the electrical generator when runner R is installed in the powerhouse substructure. During the machining and balancing operation on the runner R, runner R is suitably detachably secured to the upper surface of turntable 12 by a plurality of clamps 22 (FIG. 4) which engage bolting flange 21 of the runner, clamps 22 in turn being secured to the turntable by bolts 22A. As best seen in FIGS. 3, 4, and 5, a plurality of circumferentially spaced screw adjusting devices generally indicated at 23 engage the inner peripheral surface of bolting flange 21 to center runner R on turntable 12.

Figure 6:
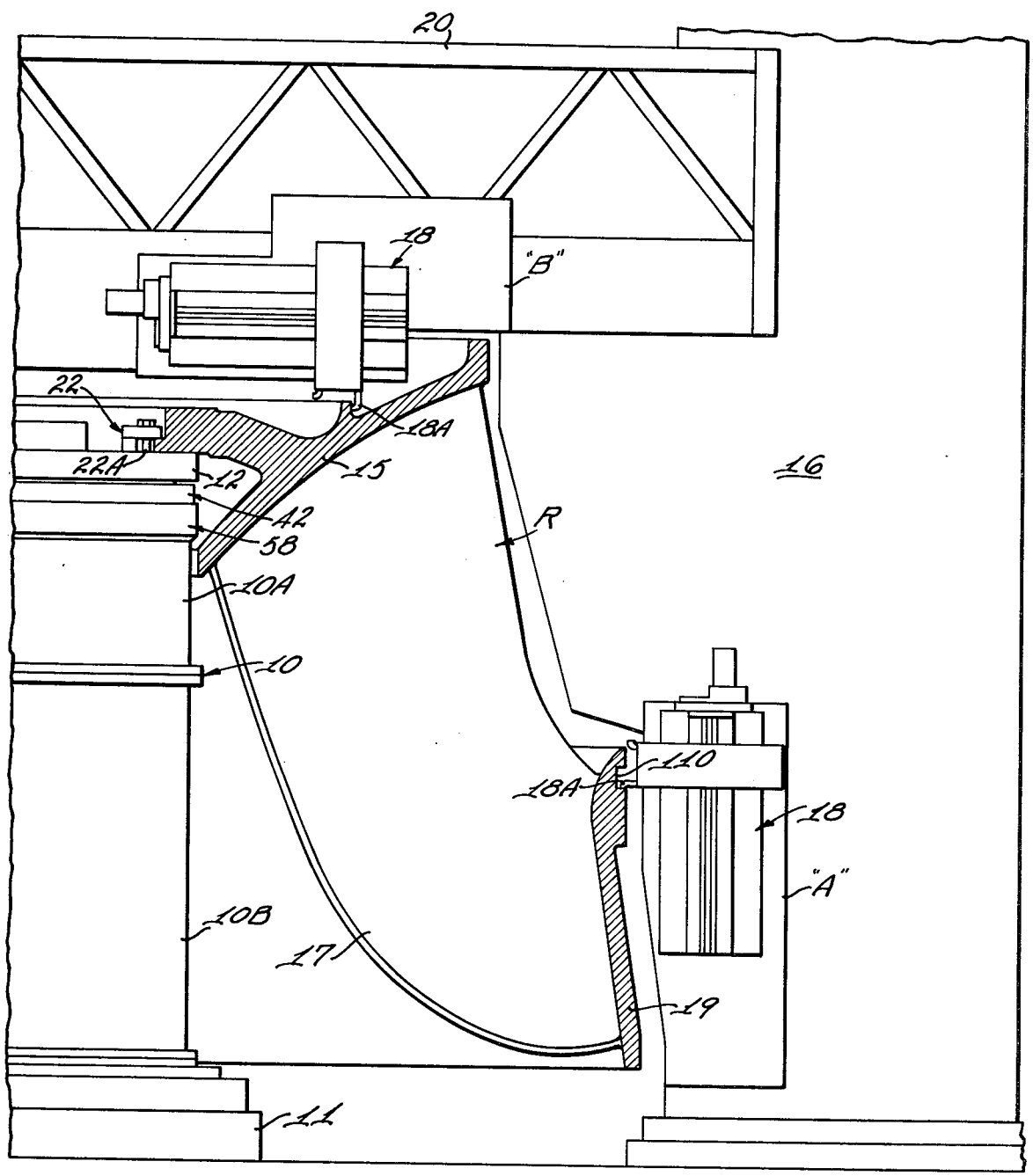
FIG. 6 is a view partially in vertical elevation and partially in vertical section showing details of several typical alternative mounting locations of the portable machine tool used for machining various surfaces of the workpiece.

Runner R rotates with turntable 12 as the turntable is rotated by suitable drive apparatus positioned within upper column portion 10A of stationary center column 10 as will be described in more detail hereinafter. A pair of oppositely disposed stationary vertical outer columns respectively indicated at 14 and 16 are positioned on opposite sides of and in spaced relation to center column 10. A stationary bridge 20 extends between and bridges the space between the two oppositely disposed stationary outer columns 14 and 16. A portable machine tool such as that indicated at 18 in FIG. 6 may be supported by outer column 16, with machine tool 18 being positioned along the path of rotary movement of runner R so that it can perform a predetermined required machining operation on runner R. Machine tool 18 as mounted on column 16 in the view of FIG. 6 is in a position designated as Position "A" which is one of a plurality of mounting positions in which the same machine tool 18 may be mounted to perform various required machining operations on runner R. In FIG. 6, the same machine tool 18 is shown in another one of its alternative mounting positions, indicated as Postion "B," in which machine tool 18 is supported by stationary bridge 20 for performing a machining operation on a different surface of runner R as compared to the surface of runner R which is being machined in Position "A".

In the embodiment illustrated in FIG. 6, and in both of the alternative positions "A" and "B", machine tool 18 supports a cutting tool 18A which performs a metal turning (i.e., metal removal) operation on runner R as the runner is rotated past cutting tool 18A with the rotating turntable 12.

The metal cutting tool 18A which performs the metal removal operation on runner R performs what is known in the art as "single point cutting" since metal cutting tool 18A has only a single cutting edge in contrast to a metal removal operation which would be performed by a rotating milling tool which has a plurality of cutting edges. Prior art metal removal arrangements for operations on workpieces such as the runner R to the best of our knowledge have usually involved the use of rotary milling tools having a plurality of cutting edges. The use of the prior art milling tools on a workpiece such as runner R has required that the workpiece being milled be either indexed past the rotary milling station or, alternatively, be rotated very slowly past the milling station. In contrast, in using the apparatus of the present invention, the turntable supporting the workpiece can be continuously rotated past the single point cutting tool 18 at a rate of speed which, although perhaps no greater than 4 revolutions per minute, is relatively much higher than in the milling type metal removal arrangements generally used in the prior art in operating on a workpiece of the type shown in the present application.

The apparatus of the present invention, including the rotatable turntable 12 mounted on machining column 10 and driven by a drive package mounted on or supported by column 10 provides a capability for "single point cutting" of the type just described which is not provided by prior art arrangements. The "single point" metal removal capability made possible by the turntable and drive arrangement of the present invention is much more efficient than metal removal operations utilizing rotary milling devices which were required by the workpiece support and drive capabilities of the prior art for operating on workpieces such as the hydro-turbine runner R.

Stationary bridge 20, in addition to serving as a support for portable machine tool 18 in one or more of the alternative mounting positions of the machine tool, also serves as a walk-way for personnel who are working on the machining and balancing project, whereby to provide access to the upper portion of stationary column 10 and to the upper portions of outer stationary columns 14 and 16 as may be necessary in connection with the machining and balancing operations.

Normally, portable machine tool 18 is only mounted on one of the outer vertical columns such as column 16, since machining devices mounted on opposite columns such as both columns 14 and 16 would normally have to be of opposite "hand." That is, if the machine tool 18 on column 16, for example, were of "right-hand" operation, then the machine tool on the opposite column 14 would have to be for "left-hand" operation. Thus, for economic reasons, in an installation of the general type hereinbefore described, the portable machine tool 18 would normally only be mounted on one column, such as column 16 as shown in the drawings. It would be possible, if required, to support machine tools such as 18 on either or both of the outer columns 14 and 16. However, for the reasons just given, if machine tool 18 is supported on outer column 16, as shown, then the other outer column 14 will not normally be used to support a machine tool 18, but will function principally as a support for one end of bridge 20.

While the turntable and turntable drive arrangement of the present invention have great utility in moving the workpiece such as runner R past a "single point" cutting tool such as 18A, as previously explained, the turntable and turntable drive arrangement of the present invention can also be used for moving the workpiece such as runner R past machining stations (not shown) located contiguous the path of rotary movement of workpiece R at which machining stations other machining operations such as rotary milling, grinding, or drilling could be performed by suitable machine tools. In the case of the milling operation, turntable 12 and workpiece R mounted thereon would either be indexed or alternatively rotated very slowly past the rotary milling station with either the indexing motion or the very slow rotary motion of the turntable being obtainable with the variable speed hydraulic motors 32A, 32B (to be described) due to the infinitely variable speed control of the hydraulic motors provided by pump 30, as will be described. Also, if drilling were being performed on runner R along the path of rotary movement of runner R, turntable 12 could be indexed to the appropriate station where the drilling is being performed. In the case of a grinding operation, the turntable and the runner R mounted on the turntable are continuously rotated past the grinding station.

As best seen in the view of FIG. 3, a power unit generally indicated at 26, and comprising an electric motor 28 and a hydraulic pump 30 mechanically driven by electric motor 28 is suitably mounted within the interior of upper column portion 10A of stationary center column 10. Hydraulic pump 30 supplies hydraulic fluid to two diammetrically oppositely disposed rotary hydraulic motors respectively indicated at 32A and 32B (FIG. 4) which cooperate to rotatably drive turntable 12 at a desired predetermined speed or in a predetermined desired direction of rotation.

Hydraulic pump 30 is of the variable displacement type. Suitable control means (not shown) are provided in association with hydraulic pump 30 for controlling the variable displacement of pump 30 whereby to control the output hydraulic flow of pump 30 in such manner as to provide an infinitely variable speed control of both hydraulic motors 32A and 32B simultaneously within a predetermined speed range such as, for example, 0-4 r.p.m., and also whereby to permit reversal of the direction of rotation of hydraulic motors 32A, 32B if desired. The output flow from hydraulic pump 30 is applied simultaneously and in a similar manner to both of the oppositely disposed hydraulic motors 32A, 32B. Each of the two hydraulic motors 32A, 32B may have a rating of 150 horsepower, for example.

A reservoir 35 for the hydraulic liquid supplied to pump 30 and a heat exchanger 37 are suitably connected in the hydraulic circuit with pump 30 and hydraulic motors 32A, 32B. The details of the hydraulic circuit connections of pump 30, hydraulic motors 32A, 32B, reservoir 35, and heat exchanger 37 are not set forth in this specification or in the drawings since such hydraulic circuit connections would be obvious to one skilled in the art, and the details of the hydraulic circuit per se form no part of the present invention.

Each of the rotary hydraulic motors 32A, 32B has the same type of output drive connection to turntable 12 and the drive connection for rotary hydraulic motor 32A will be described as illustrative of the drive connections of both rotary hydraulic motors 32A, 32B. Thus, as best seen in FIG. 5, hydraulic motor 32A is provided with a rotatable output shaft 34 which is connected by means of a flexible coupling 36 to the lower end of a pinion shaft 38. The upper end of pinion shaft 38 has integral therewith a pinion gear 40. Each of the respective diametrically oppositely disposed pinion gears 40 driven by the respective hydraulic motors 32A, 32B is adapted to mesh with and drivingly engage an internal ring gear 44 (FIGS. 4 and 5) of a composite bearing and gear generally indicated at 42 which is in underlying relation to turntable 12. In the illustrated embodiment, composite bearing and gear 42 comprises a roller bearing 43 including an inner race 43A and an outer race 43B, with roller bearing elements 43C being interposed between inner and outer races 43A and 43B. While the bearing is preferably a roller bearing as indicated at 43, other types of bearings could be used instead. Internal ring gear 44 which meshes with the teeth of the diametrically oppositely disposed pinion gears 40 is suitably affixed to or carried by the radially inner surface of inner race 43A of composite bearing and gear 42. Internal ring gear 44 extends through a circumferential angle of 360°. Inner race 43A of composite bearing and gear 42 is secured by means of a plurality of circumferentially spaced socket head cap screws 46 to turntable 12, and outer race 43B of composite bearing and gear 42 is secured by a plurality of circumferentially spaced cap screws 47 to a stationary support defined by the outer peripheral portion 58A of cover plate 58 of upper column portion 10A of center column 10.

A plurality of circumferentially spaced cylindrical passages or apertures 50 are provided in turntable 12, the central axis of each aperture 50 lying at the same radial distance from the center of turntable 12 as does the central axis of pinion shaft 38 and of pinion 40 carried by shaft 38. Each of the cylindrical apertures 50 is covered at the upper end thereof by a corresponding removable cover plate 52 which lies substantially in the same plane as the upper surface of turntable 12. The purpose of cylindrical apertures 50 and of cover plates 52 therefor is to provide access to pinions 40 whereby to permit removal of pinions 40 and the corresponding pinion shafts 38 with which the respective pinions 40 are integral when it is necessary to replace pinions 40 because of wear on the pinion teeth or for other reasons, whereby pinions 40 and the pinion shafts 38 with which they are integral may be removed and replaced without the necessity of removing workpiece R from the turntable.

Lower column portion 10B of stationary center column 10 has a hollow interior and is provided on the interior thereof with a ladder (not shown) by means of which the workman or operator may climb up within stationary center column 10 to work on apparatus housed within column 10. A maintenance platform (not shown) is also provided intermediate the height of and on the interior of lower column portion 10B. A suitable access door or opening is provided in the lower portion of center column 10 to permit access by a workman or an operator to the interior of column 10 as required.

As best seen in FIGS. 3 and 5, a further important feature of the construction is the provision of a power operated linear actuator in the form of a linear hydraulic motor including a hydraulic cylinder 60 and a piston 62 movable in cylinder 60. Hydraulic cylinder 60 is formed in the upper portion of cover plate 58 of upper column portion 10A of stationary center column 10. Piston 62 is received within the interior of cylinder 60, piston 62 extending upwardly through a centrally located aperture 63 in turntable 12. A piston cap 64 is fixed to the upper end of piston 62 by means of screws 65, and moves with piston 62. Piston cap 64 is also rigidly secured by screws 66 to the upper end of turntable 12 whereby turntable 12 moves vertically in accordance with any vertical movement of piston 62, and also whereby piston 62 rotates in cylinder 60 as turntable 12 rotates.

The lower end of hydraulic cylinder 60 is suitably connected through an inlet passage 71 (FIG. 5) in cover plate 58 of upper column portion 10A to an inlet valve 69 which may in turn be connected through a suitable conduit 73 to a portable hydraulic power unit 77 as diagrammatically shown in FIG. 5.

Portable hydraulic power unit 77 is a self-contained unit including a pump for pumping a hydraulic fluid such as oil, an electric motor for driving the pump, a reservoir for containing a supply of the hydraulic fluid, and a manually operated control valve 77A for controlling the flow of the hydraulic fluid. The connection of portable hydraulic power unit 77 to the interior of cylinder 60 permits the introduction of hydraulic fluid when desired from the reservoir of portable hydraulic power unit 77 into the lower end of cylinder 60 beneath piston 62 whereby to apply upward pressure against the under surface of piston 62.

A seal 68 is received in a circumferential groove in a spherical surface portion 62A formed on the lower end of piston 62. Spherical surface portion 62A extends circumferentially around the entire lower periphery of piston 62, spherical surface portion 62A also extending radially beyond the piston outer wall portion 62B which lies above the spherical wall portion 62A.

A safety or overflow port 70 is provided in the upper wall portion of hydraulic cylinder 60. If the hydraulic fluid introduced beneath the under surface of piston 62 causes piston 62 to rise to such a height within cylinder 60 that piston seal 68 rises above the bottom level of safety or overflow port 70, the hydraulic pressure within cylinder 60 will be relieved since the hydraulic fluid then passes through safety or overflow port 70 and through suitable passage means back to the reservoir provided in portable hydraulic unit 77 (FIG. 5) to thereby relieve the hydraulic pressure within cylinder 60 to prevent further upward movement of piston 62 within cylinder 60. This prevents undesired excessive upward movement of piston 62. Such upward movement of piston 62 in cylinder 60 as just referred to could only occur in connection with the movement of piston and turntable 12 preparatory to or during the balancing operation on runner R, at which time turntable 12 is physically disconnected from composite bearing and gear 42 due to the removal of screws 46, as will be explained hereinafter. No upward movement of piston 62 and turntable 12 occurs during the machining operation on workpiece R, even though hydraulic pressure is applied to piston 62 to help relieve the thrust load on bearing 43, as will be explained, since composite bearing and gear 42 remains connected to turntable 12 during the machining operation.

Cylinder 60 and the cooperating piston 62 which moves in cylinder 60 define a "single acting" hydraulic jack in which hydraulic fluid such as oil is admitted to the interior of cylinder 60 beneath piston 62 through inlet valve 69 and conduit 71 (FIG. 5) whereby to cause upward movement of piston 62 and turntable 12 preparatory to and during the balancing operation on runner R (assuming that the composite bearing and gear 42 has been detached from turntable 12); and in which downward movement of piston 62 is caused by the action of gravity when valves 69 and 77A (FIG. 5) in the hydraulic circuit of cylinder 60 are opened to permit drainage of the hydraulic fluid out of cylinder 60 and back to the fluid reservoir which forms part of portable hydraulic power unit 77. In other words, in the cylinder-piston arrangement 60-62, hydraulic fluid is only admitted to cylinder 60 to move piston 62 in an upward direction, and hydraulic fluid is not admitted to cylinder 60 to move piston 62 in a downward direction.

A significant feature of the construction is the fact that hydraulic pressure may be applied from portable hydraulic power unit 77 to the underneath surface of piston 62 and thus to the attached turntable 12 during the machining operation and while turntable 12 is rotating, for the purpose of reducing the thrust force on bearing 43. This upward hydraulic pressure on piston 62 does not result in any upward movement of piston 62 and turntable 12, since turntable 12 at this time is attached to composite bearing-gear 42 by screws 46. However, the upward pressure exerted on piston 62 and thus on turntable 12 results in a very significant reduction in the thrust load on roller bearing 43. It might be noted that during the machining operation on runner R and while turntable 12 is rotating, there is a very substantial frictional force on roller bearing 43 which produces a high thrust load on bearing 43. In the absence of upward hydraulic pressure on piston 62 as just explained, the frictional thrust load on bearing 43 during the machining operation would consume a large portion of the output power of hydraulic motors 32A, 32B. However, by continuously maintaining a predetermined hydraulic fluid pressure in hydraulic cylinder 60 under piston 62 during the machining operation on runner R and while turntable 12 is rotating, as just explained, an upward force is imparted to turntable 12 whereby a very large predetermined portion of the thrust load such as 80%-90% of the thrust load on bearing 43, for example, may be relieved. By thus relieving a substantial part of the thrust load on bearing 43, a relatively much greater portion of the output power of hydraulic motors 32A and 32B transmitted to rotating turntable 12 is available for the machining operation as the turntable rotates the workpiece R past the machining tool such as the single point cutting tool 18A of FIG. 6. During the machining operation on the workpiece such as runner R, hydraulic cylinder 60 is preferably continuously hydraulically pressurized to exert a predetermined upward force on piston 62 and consequently on the rotating turntable 12 sufficiently to relieve a predetermined portion such as 80%-90%, for example, of the thrust load on bearing 43, as just explained. In pressurizing hydraulic cylinder 60 as just described to exert an upward force on piston 62 for the purpose of relieving thrust load on bearing 43, the portable hydraulic power unit 77 which is connected to the inlet of valve 69 as shown in FIG. 5 is turned on and valve 77A on portable hydraulic unit 77 is opened. The electrically operated pump which forms part of portable hydraulic power unit 77 will pump hydraulic fluid through conduit 73, valve 69, and passage 71 to the interior of hydraulic cylinder 60 beneath piston 62, thereby exerting an upward force on piston 62, although piston 62 will not move upwardly due to the connection of turntable 12 to composite bearing-gear 42. When pressure gauge P which is connected to passage 71 leading to cylinder 60 indicates that the desired predetermined hydraulic pressure in cylinder 60 has been reached, valve 69 is closed to trap hydraulic fluid in cylinder 60, and portable hydraulic unit 77 is turned off. The predetermined hydraulic pressure which is now present in cylinder 60 will exert the required upward force on piston 62 and the connected turntable 12 which is required to provide the predetermined desired reduction in the thrust load on bearing 43.

Portable hydraulic power unit 77 although turned off normally remains connected to inlet valve 69 as shown in FIG. 5 for the remainder of the machining operation on workpiece R, and inlet valve 69 remains closed to trap the hydraulic fluid in cylinder 60 as previously described. However, if, at any time, pressure gauge p indicates that the hydraulic pressure in cylinder 60 has dropped below the predetermined desired value due to leakage or the like from cylinder 60, portable hydraulic power unit 77 may be started up again, to restore the pressure in cylinder 60 back to the desired value, after which portable hydraulic power unit 77 is again shut down.

The amount of upward force exerted on piston 62 to obtain a desired amount of reduction of the thrust load on bearing 43 can be adjusted by providing a predetermined hydraulic pressure in cylinder 60 beneath piston 62, this pressure being sensed by pressure gauge P (FIG. 5) which measures hydraulic pressure in the inlet conduit to cylinder 60. Since the total upward force on piston 62 is a function of the hydraulic pressure in cylinder 60 and also of the area of the underneath surface of piston 62 against which the hydraulic pressure is exerted, the upward force in piston 62 and thus on turntable 12 is a determinable quantity; and hence the hydraulic pressure in cylinder 60 beneath piston 62 can be controlled to provide a predetermined desired reduction of thrust load on bearing 43.

This greater power capacity available for the machining operation when a predetermined portion of the thrust load on bearing 43 is relieved by upward hydraulic pressure on piston 62 is particularly advantageous in connection with making more power available for use in a metal removal operation employing "single point cutting" as illustrated by the use of cutting tool 18A in FIG. 6.

As will be explained more fully hereinafter, cylinder 60 is also hydraulically pressurized preparatory and during the static balancing operation on workpiece R, upon the completion of the machining operation on workpiece R, whereby to raise piston 62 and the attached turntable 12, but with the underlying composite bearing and gear 42 detached from the turntable, and whereby to maintain turntable 12 at a predetermined elevation above and free and clear of the underlying composite bearing and gear 42, with turntable 12, runner R, and piston 62 "floating" on the hydraulic fluid such as oil in cylinder 60 during the static balancing operation on runner R.

An important feature of the relationship of hydraulic cylinder 60 and of piston 62 which is movable in cylinder 60 is that during the static balancing operation on runner R, as will be explained in more detal hereinafter, and with turntable 12 physically disconnected from and elevated above and free of the underlying composite bearing and gear 42, the normally vertical axis of piston 62 which is rigidly connected to turntable 12 can tilt slightly with respect to the vertical axis of cylinder 60 whereby to indicate an unbalanced distribution of weight of the runner R which is secured to and carried by turntable 12. The tilting of piston 62 is made possible by the spherical contour of the piston wall portion 62A (FIG. 5), spherical wall portion 62A extending around the entire circumference of the lower end of piston 62 in the region of seal 68. The spherical surface 62A allows tilting movement of piston 62 without allowing intimate contact of piston 62 with the wall of cylinder 60, and yet permits seal 68 to maintain a good sealing contact between piston 62 and cylinder 60 at all times. The maximum tilt of piston 62 during the runner balancing operation to be described, corresponding to a maximum tilt of substantially one inch of the under surface of runner band 19 relative to the stationary supports 92 (FIG. 9) underlying the runner during the balancing operation, may be, for example, of the order of magnitude of 0.0052 radian, which is an angle of approximately 18 minutes or 0.3 degree.

Description of the Static Balancing Procedure

At the completion of the machining operation on runner R, power unit 26 which includes electric motor 28 which drives hydraulic pump 30 is shut down, with the result that the two rotary hydraulic motors 32A, 32B which drive rotatable turntable 12 are also shut down, and turntable 12 stops rotating.

Also, preparatory to the static balancing operation on runner R, a plurality of hydraulic jacks 90 such as six, for example, are placed in circumferentially spaced relation to each other as diagrammatically shown in FIG. 7 and in underlying relation to the circumferentially extending runner band 19 at the lower end of the runner, the underneath surface of runner band 19 being the lowest point of the runner with respect to the mounting orientation of the runner on turntable 12.

Also, a plurality of stationary supports each generally indicated at 92, and each comprising a stationary jackstand 94 and a spacer 96 on top of each jackstand 94 (see FIG. 8), are positioned in circumferentially spaced relation to each other and in underlying relation to runner band 19 in the same manner as hydraulic jacks 90. Each of the stationary supports 92 is positioned in circumferentially spaced relation to the hydraulic jacks 90 intermediate a pair of adjacent hydraulic jacks 90, as also diagrammatically shown in FIG. 7. The purpose of supports 92 is to be in supporting relation to runner R when hydraulic jacks 90 are disconnected from the portable hydraulic power unit 77 diagrammatically shown in FIG. 7 (the same portable hydraulic power unit 77 is also shown in FIG. 5). Stationary supports 92 also serve as a safety feature during the static balancing operation when runner R and turntable 12 are supported by piston 62, as will be described, in case piston seal 68 should fail, which would result in a loss of hydraulic pressure on piston 62 with consequent dropping of piston 62 and the attached turntable 12 and runner R.

With the plurality of hydraulic jacks 90 and the plurality of stationary supports 92 arranged as shown in FIG. 7, screws 46 (FIG. 5) which secure composite bearing and gear 42 to turntable 12 are removed, whereby turntable 12 is then free to move vertically above composite bearing-gear 42 and independently of composite bearing-gear 42 when upward pressure is applied to runner R by means of hydraulic jacks 90, as will be described. Portable hydraulic power unit 77 which had previously been connected to hydraulic cylinder 60 during the machining operation as shown in FIG. 5, for the purpose of reducing the thrust load on bearing 43, as previously described, is now connected to the plurality of hydraulic jacks 90 for the purpose of raising the hydraulic jacks. Portable hydraulic power unit 77 is activated to pump hydraulic fluid from the fluid reservoir which forms part of portable hydraulic unit 77 to thereby pressurize hydraulic jacks 90. Hydraulic jacks 90 are pressurized sufficiently to raise runner R and turntable 12 to which runner R is secured by a vertical distance such that additional spacers 98 and 100 (FIG. 8) may be placed on top of the respective spacer 96 which already is positioned on top of each respective jackstand 94, so that the under surface of runner R now rests on the upper surface of uppermost spacer 100 on each jackstand 94, as seen in FIG. 8. The hydraulic fluid in hydraulic jacks 90 is then drained back into the hydraulic fluid reservoir associated with portable hydraulic power unit 77, with the result that hydraulic jacks 90 are no longer in supporting relation to runner R and turntable 12. Portable hydraulic power unit 77 is then disconnected from hydraulic jacks 90. However, runner R and turntable 12 remain in the position to which they have been elevated by hydraulic jacks 90 due to the support provided by the plurality of underlying stationary supports comprising the respective jackstands 94 and the superposed spacers 96, 98, 100 on each jackstand 94.

Portable hydraulic power unit 77 is then reconnected by means of conduit 73 to valve 69 as shown in FIG. 5 which again places portable hydraulic power unit 77 in hydraulic communication through passage 71 with the interior of hydraulic cylinder 60. Hydraulic power unit 77 is turned on and hydraulic fluid from the fluid reservoir of portable hydraulic power unit 77 is admitted through valve 77A, conduit 73, valve 69 and passage 72 into hydraulic cylinder 60 to raise piston 62 and turntable 12 secured to piston 62 sufficiently to move runner 12 vertically enough so that the under surface of runner band 19 just barely clears (by about 1/32 inch, for example) the upper surface of the uppermost spacer 100 on each of the respective stationary jackstands 94. When piston 62 and turntable 12 have been moved upwardly as just described, valve 69 is then closed to trap the hydraulic fluid in cylinder 60, and portable hydraulic power unit 77 is then turned off.

In the raised position of piston 62 just described, turntable 12 connected to piston 62 will have been raised out of the typically 0.75 inch deep centering joint indicated at 45 (FIG. 5) sufficiently for the lowermost surface of turntable 12 to vertically clear the uppermost surface of composite bearing-gear 42 by about one inch, to the position indicated in phantom line in FIG. 5. The uppermost spacer 100 shown in FIG. 8 which has an appropriate vertical thickness, such as a thickness of one inch, is then removed from above each of the plurality of stationary jackstands 94 as seen in FIG. 9, with the result that the under surface of runner band 19 (i.e.—the lowest surface of runner R) which, prior to the pressurization of piston 62, and as shown in FIG. 8, has rested on the uppermost surface of spacer 100 lying on top of each of the respective stationary jackstands 94, is now suspended as shown in FIG. 9, by a vertical distance such as slightly more than one inch in spaced relation above the uppermost surface of the spacer 98 which now rests on top of each of the respective stationary jackstands 94. This vertical spacing of runner R above spacer 98 as seen in FIG. 9 limits the maximum tilt during the balancing operation of runner R caused by improper distribution of weight in runner R. Runner R and turntable 12 to which the runner is clamped are maintained by piston 62 in the elevated position just described and shown in FIG. 9 due to the presence of hydraulic fluid such as oil in cylinder 60 beneath piston 62 continuously during the balancing operation. In the position of FIG. 9, piston 62, turntable 12, and runner R supported on turntable 12 all tiltingly float on the hydraulic fluid such as oil in cylinder 60 beneath piston 62.

After runner R and turntable 12 have been placed in the "floating" position as just described, in which the lower end of runner band 19 is suspended above the upper surface of the respective spacer member 98 on each of the plurality of jackstands 94, as seen in the view of FIG. 9, and with turntable 12 mechanically disconnected from the underlying composite bearing-gear 42 as previously explained, the balancing procedure in which the hydro-turbine runner R is balanced for any improper distribution of weight now proceeds as follows, referring to the schematic view of FIG. 10:

1. Position the two machinist's levels $L_x$ and $L_y$ which are spirit (bubble-type) levels so that the respective levels lie on the upper surface of the bolting flange 21 (also shown in FIGS. 1, 3, 4, 5 and 6), the levels $L_x$ and $L_y$ respectively lying on the axes X—X and Y—Y which lie in a common plane with each other but in perpendicular relation to each other within that common plane.

2. A test weight $TW_x$ is placed at a position on the upper surface of runner crown 15 along axis X—X, the location of test weight $TW_x$ being such as to make the level $L_x$ indicate that the upper surface of bolting flange 21 is level along the axis X—X.

3. In a similar manner, a second test weight $TW_y$ is placed on the upper surface of runner crown 15 along the Y—Y axis at a location such that the level $L_y$ indicates that the upper surface of bolting flange 21 is level along the axis Y—Y.

It will be noted as previously explained that if the weight of the runner R is improperly distributed it will cause turntable 12, and consequently runner R which is clamped to the upper surface of turntable 12, to tilt due to the unbalanced weight distribution condition of runner R. As previously explained, this tilting of turntable 12 and of runner R carried by turntable 12 is made possible by the fact that turntable 12 is rigidly connected to piston 62 which, in turn, can tilt in cylinder 60, as previously explained, piston 62, turntable 12 and runner R in effect tiltably floating on the hydraulic fluid such as oil in cylinder 60 beneath piston 62.

4. With bolting flange 21 of runner R level along both the X—X and along the Y—Y axis as just described due to the addition of the test weights $TW_x$ and $TW_y$, an additional weight is added along both the X—X axis and along the Y—Y axis to take runner R past th center or level condition in which it has just be balanced. The additional weights are then removed and the runner should then relevel itself. This additional check is to assure that friction between piston 62 and cylinder 60 is not affecting the balance.

5. The radius $R_1X$ from the center C of bolting flange 21 to the location of test weight $TW_x$ along the X—X axis is then measured. Similarly, the radius $R_1Y$ from the center C of bolting flange 21 to the location of test weight $TW_y$ along the Y—Y axis is also measured.

6. The compensating or balancing weight $CW_x$ which is to be permanently added to the weight pocket 110 of runner R along the axis X—X is computed using the following equation:

$$CW_x = (TW_x)(R_1X)/R_2$$

where:
   $CW_x$ = the weight in pounds of the compensating weight to be placed in the weight pocket 110 along the X—X axis;
   $TW_x$ = the weight in pounds of the test weight positioned along the X—X axis;
   $R_1X$ = the radius in inches from center C of boiling flange 21 to the location of the test weight $TW_x$ along the X—X axis;
   $R_2$ = the radius in inches from center C of bolting flange 21 to the weight pocket 110 in which the permanent compensating weight $CW_x$ along the X—X axis is to be positioned.

7. In a similar manner, the value of the compensating or balancing weight $CW_y$ which is to be permanently added to weight pocket 110 along the Y—Y axis is computed using the following equation similar to the equation used in computing the compensating weight along the X—X axis, namely:

$$CW_y = (TW_y)(R_1Y)/R_2$$

where:
   $CW_y$ = the weight in pounds of the compensating weight to be placed in weight pocket 110 along the Y—Y axis;
   $TW_y$ = weight in pounds of the test weight positioned along the Y—Y axis;
   $R_1Y$ = the radius in inches from the center C of bolting flange 21 to the location of test weight $TW_y$ along the Y—Y axis;
   $R_2$ = the radius in inches from the center C of bolting flange 21 to weight pocket 110 along the Y—Y axis in which the permanent compensating weight along the Y—Y axis is positioned.

The radius $R_2$ from the center C of bolting flange 21 to the center of weight pocket 110 is the same along both the X—X and the Y—Y axes.

8. Having determined by solution of the foregoing equations the weight in pounds of the compensating or balancing weights $CW_x$ and $CW_y$ to be placed in weight pocket 110 along the respective X—X and Y—Y axes, the length of the weight bars to be added is determined by the following equation:

$$\text{Length of weight bar} = \frac{\text{Weight } CW_x \text{ or } CW_y \text{ to be added in weight pocket along axes } X-X \text{ or } Y-Y}{\text{Weight per inch of weight bar}}$$

For example, the steel weight bar may have a weight of 5.25 pounds per inch. Knowing the weight per inch of the weight bar and the weight in pounds of each of the compensating weights $CW_x$ and $CW_y$ required, the lengths of the compensating weights can be calculated using the above equation. Having determined the length of the weight bars for the respective compensating weights $CW_x$ and $CW_y$ as explained in step 8, it is then necessary to correct the length of the respective weight bars just calculated to correct for the fact that each of the compensating or balancing weight bars to be added in weight pocket 110 is in the shape of an arc. Hence, a correction factor "K" must be applied to the length of each of the weight bars $CW_x$ and $CW_y$ obtained in step 8, the corrected length being obtained by using the following equation:

"K"x(length of weight bar obtained in step 8)=corrected length of weight bar where "K" is a factor which compensates for the change in center of gravity of each of the respective compensating or balancing weight bars $CW_x$ and $CW_y$ due to the fact that each of the respective weight bars is in the shape of an arc.

9. Having determined the corrected length of the respective compensating weight bars as just explained in step 8, each of the compensating weight bars $CW_x$ and $CW_y$ is then cut to the corrected length as just explained, and the centerline of each weight bar is marked. After having done this, each arcuate weight bar is positioned in the circumferentially extending weight pocket 110 with the centerline of the compensating weight bar $CW_x$ being matched to the centerline of the X—X axis, and with the centerline of the $CW_y$ weight bar being matched to the centerline of the Y—Y axis. Each respective compensating weight bar $CW_x$ and $CW_y$ is positioned on the same side of the center point C of bolting flange 21 along the corresponding X—X or Y—Y axis as the location of the corresponding test weight $TW_x$ or $TW_y$. That is, for example, if to obtain a balanced condition along the X—X axis test weight $TW_x$ must be positioned along axis X—X to the left of center point C relative to the view of FIG. 10, then the compensating weight bar $CW_x$ must also be placed along axis X—X to the left of center point C. Similarly, the compensating weight bar $CW_y$ must be positioned along the Y—Y axis of the same side of the center point C as the position of test weight $TW_y$ at which a balanced condition was obtained along the Y—Y axis. Each of the compensating weight bars $CW_x$ and $CW_y$ is then tack welded to weight pocket 110 to secure the respective weight bars in weight pocket 110. The balancing procedure is now completed.

From the foregoing description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. An apparatus for use in machining and statically balancing a large and heavy workpiece, said apparatus comprising a vertical support means, a turntable mounted for rotation on the upper end of said vertical support means, said turntable being adapted to support said workpiece and to rotatably move said workpiece past a machining tool which is stationarily mounted contiguous the path of rotary movement of said workpiece whereby to machine said workpiece, a composite member of annular shape positioned in underlying relation to said turntable, said composite member comprising a bearing having an inner race and an outer race and bearing elements interposed between said inner race and said outer race, said outer race being secured to said vertical support means, said inner race being detachably secured to said turntable, an internal ring gear carried by a radially inner portion of said inner race, a motor means carried by said vertical support means and positioned beneath said turnable, a pinion gear rotatably driven by said motor means, said pinion gear being in geared engagement with said internal ring gear whereby to rotatably drive said turntable when said turntable is secured to said inner race, a power operated linear actuator comprising a cylinder carried by said vertical support means and a piston positioned within said cylinder, said piston being secured to said turntable whereby said piston and said turntable move in unison, said piston being rotatably movable within said cylinder as said piston rotates with said turntable, said piston also being vertically movable within said cylinder when said turntable is detached from said inner race, said cylinder being adapted to receive fluid under pressure whereby fluid pressure may be exerted against said piston and thus against said turntable and while said turntable is still connected to said inner race and is rotating during the machining operation on said workpiece, whereby to exert upward force on said piston and on said turntable and thus relieve thrust load on said bearing, said piston being movable upwardly in said cylinder by fluid pressure when said turntable is detached from said inner race subsequent to the completion of the machining operation on said workpiece, whereby to elevate said turntable above and clear of said inner race and in position for the static balancing of the workpiece mounted on said turntable, said piston including a surface portion bearing against the cylinder wall and shaped to permit tilting movement of said piston in said cylinder during the balancing of said workpiece due to unbalanced weight distribution in said workpiece whereby to permit tilting of said turntable and of the workpiece mounted on said turntable.

2. An apparatus as defined in claim 1 including a pair of diametrically opposed motors mounted on said vertical support means, a separate pinion gear driven by each of said drive motors, each of said pinion gears being in geared engagement with said internal ring gear whereby to rotatably drive said turntable when said turntable is secured to said inner race.

3. An apparatus as defined in claim 1 in which said bearing is a roller bearing and said bearing elements are rollers.

4. An apparatus as defined in claim 1 in which said motor is a hydraulic motor having a rotary output, and hydraulic circuit means for supplying hydraulic fluid to said hydraulic motor whereby to cause rotation of said hydraulic motor.

5. An apparatus for use in machining and statically balancing a large and heavy workpiece, said apparatus comprising a vertical support means, a turntable mounted for rotation on the upper end of said vertical support means, said turntable being adapted to support said workpiece and to rotatably move said workpiece past a machining tool which is stationarily mounted contiguous the path of rotary movement of said workpiece whereby to machine said workpiece, a composite member of annular shape positioned in underlying relation to said turntable, said composite member comprising a bearing having an inner race and an outer race and bearing elements interposed between said inner race and said outer race, said outer race being secured to said vertical support means, said inner race being detachably secured to said turntable, an internal ring gear carried by a radially inner portion of said inner race, a motor means carried by said vertical support means and positioned beneath said turntable, a pinion gear rotatably driven by said motor means, said pinion gear being in geared engagement with said internal ring gear whereby to rotatably drive said turntable when said turntable is secured to said inner race, said turntable being provided with aperture means therethrough, the center of said aperture means lying at the same radial distance from the center of said turntable as does the axis of rotation of said pinion gear, whereby said aperture means is movable by rotation of said turntable into concentric overlying relation to said pinion gear, whereby to permit removal of said pinion gear through said aperture means, and cover means for said aperture means, said cover means being movable out of covering relation to said aperture means to permit removal of said pinion gear, a power operated linear actuator comprising a cylinder carried by said vertical support means and a piston positioned within said cylinder, said piston being secured to said turntable whereby said piston and said turntable move in unison, said piston being rotatably movable within said cylinder as said piston rotates with said turntable, said piston also being vertically movable within said cylinder when said turntable is detached from said inner race, said cylinder being adapted to receive fluid under pressure whereby fluid pressure may be exerted against said piston and thus against said turntable and while said turntable is still connected to said inner race and is rotating during the machining operation on said workpiece, whereby to exert upward force on said piston and on said turntable and thus relieve thrust load on said bearing, said piston being movable upwardly in said cylinder by fluid pressure when said turntable is detached from said inner race subsequent to the completion of the machining operation on said workpiece, whereby to elevate said turntable above and clear of said inner race and in position for the static balancing of the workpiece mounted on said turntable, said piston including a surface portion bearing against the cylinder wall and shaped to permit tilting movement of said piston in said cylinder during the balancing of said workpiece due to unbalanced weight distribution in said workpiece whereby to permit tilting of said turntable and of the workpiece mounted on said turntable.

6. An apparatus as defined in claim 5 in which said bearing is a roller bearing and said bearing elements are rollers.

7. An apparatus as defined in claim 5 in which said motor is a hydraulic motor having a rotary output, and hydraulic circuit means for supplying hydraulic fluid to said hydraulic motor whereby to cause rotation of said hydraulic motor.

8. An apparatus as defined in claim 5 in which said turntable is provided with a plurality of circumferentially spaced apertures therethrough, the center of each of said apertures lying at the same radical distance from the center of said turntable as does the axis of rotation of said pinion gear, whereby each of said apertures is movable by rotation of said turntable into concentric overlying relation to said pinion gear, whereby to permit removal of said pinion gear through any one of said plurality of apertures, and separate cover means for each of said apertures, each cover means being movable out of covering relation to its corresponding aperture to permit removal of said pinion gear through said corresponding aperture.

9. An apparatus as defined in claim 5 including a pair of diametrically opposed motors mounted on said vertical support means, a separate pinion gear driven by each of said drive motors, each of said pinion gears being in geared engagement with said internal ring gear whereby to rotatably drive said turntable when said turntable is secured to said inner race.

10. An apparatus for use in machining a large and heavy workpiece, said apparatus comprising a vertical support means, a turntable mounted for rotation on the upper end of said vertical support means, said turntable being adapted to support said workpiece and to rotatably move said workpiece past a machining tool which is stationarily mounted contiguous the path of rotary movement of said workpiece whereby to machine said workpiece, a composite member of annular shape positioned in underlying relation to said turntable, said composite member comprising a bearing having an inner race and an outer race and bearing elements interposed between said inner race and said outer race, said outer race being secured to said vertical support means, said inner race being detachably secured to said turntable, an internal ring gear carried by a radially inner portion of said inner race, a motor means carried by said vertical support means and positioned beneath said turntable, a pinion gear rotatably driven by said motor means, said pinion gear being in geared engagement with said internal ring gear whereby to rotatably drive said turntable when said turntable is secured to said inner race, said turntable being provided with aperture means therethrough, the center of said aperture means lying at the same radial distance from the center of said turntable as does the axis of rotation of said pinion gear, whereby said aperture means is movable by rotation of said turntable into concentric overlying relation to said pinion gear, whereby to permit removal of said pinion gear through said aperture means, and cover means for said aperture means, said cover means being movable out of covering relation to said aperture means to permit removal of said pinion gear, a power operated linear actuator comprising a cylinder carried by said vertical support means and a portion positioned within said cylinder, said piston being secured to said turntable whereby said piston and said turntable move in unison, said piston being rotatably movable within said cylinder as said piston rotates with said turntable, said piston also being vertically movable within said cylinder when said turntable is detached from said inner race, said cylinder being adapted to receive fluid under pressure whereby fluid pressure may be exerted against said piston and thus against said turntable and while said turntable is still connected to said inner race and is rotating during the machining operation on said workpiece, whereby to exert upward force on said piston and on said turntable and thus relieve thrust load on said bearing.

11. An apparatus as defined in claim 10 including a pair of diametrically opposed motors mounted on said vertical support means, a separate pinion gear driven by each of said drive motors, each of said pinion gears being in geared engagement with said internal ring gear whereby to rotatably drive said turntable when said turntable is secured to said inner race.

* * * * *